(12) United States Patent
Mihailovic

(10) Patent No.: US 6,343,561 B1
(45) Date of Patent: Feb. 5, 2002

(54) LINE JAMMER DEVICE

(75) Inventor: Pierre Mihailovic, Manson (FR)

(73) Assignee: Wichard, Thiers (FR)

( * ) Notice: Subject to any disclaimer, the term of this patent is extended or adjusted under 35 U.S.C. 154(b) by 0 days.

(21) Appl. No.: 09/576,213

(22) Filed: May 23, 2000

(30) Foreign Application Priority Data

Jun. 7, 1999 (FR) .......................................... 99 07367

(51) Int. Cl.⁷ .............................................. B63B 21/08
(52) U.S. Cl. ..................................... 114/199; 188/65.1
(58) Field of Search ........................ 114/199; 188/65.1, 188/65.2, 65.5

(56) References Cited

U.S. PATENT DOCUMENTS

| | | | | |
|---|---|---|---|---|
| 1,692,640 A | * | 11/1928 | Erickson | 114/199 |
| 3,186,372 A | * | 6/1965 | Cleveland | 114/199 |
| 4,465,011 A | * | 8/1984 | Merry | 114/199 |

FOREIGN PATENT DOCUMENTS

| | | |
|---|---|---|
| DE | 1 231 C | 11/1877 |
| FR | 2 753 159 A1 | 3/1998 |

* cited by examiner

Primary Examiner—Jesus D. Sotelo
(74) Attorney, Agent, or Firm—Oliff & Berridge, PLC (57) ABSTRACT

The line jammer device is a device for jamming a line which is under tension upstream of the device when it is in a locked state and releasing the line when it is in an unlocked state. The device has a first line gripping member and a second line gripping member. The first line gripping member has a circular surface around which the line is wound between a fraction of a turn corresponding to an angle of more than 180° and at least one turn. The second line gripping member is arranged in such a way that the grip it exerts on the line is exerted once the line has been wrapped around the first gripping member between a fraction of a turn corresponding to an angle of at least 180° and at least one turn.

16 Claims, 7 Drawing Sheets

LINE JAMMER DEVICE

BACKGROUND OF THE INVENTION

The present invention relates to a line jammer device for, in a locked state, jamming a line which is under tension upstream of the device and, in an unlocked state, releasing this line.

The term "upstream" defines that end of the line which is connected to the object that has to be tensioned using this line, and the term "downstream" defines the opposite end.

This device is intended in particular to be used on pleasure sailing boats, to jam various lines involved in the rigging of these boats, particularly the halyards, but this application is not restrictive. The term "upstream" then, in the case of a halyard, defines that end of the line that is connected to the sail, and the term "downstream" defines the end via which the halyard is intended to be manipulated using a capstan.

DESCRIPTION OF THE PRIOR ART

Such line jammer devices are known in principle and are in widespread use on sailing boats.

An existing device, generally known by the name of a jamming cleat, comprises two pivoting cams, returned so that they pivot toward one another, and each having a curved lateral portion on its side that faces the other cam. The line is engaged between these cams, against the return force exerted on them, and the tension it experiences upstream causes the cams to pivot in the direction that causes the line to be gripped by these cams.

A device of this type exhibits a number of drawbacks, particularly as regards its limited ability to withstand high tension, the difficulty in releasing the line when such tension is exerted, the need to reinsert the line between the cams after each release, and the not insignificant amount of wear that the grip of the cams causes to the line.

These drawbacks appreciably restrict the use of these devices.

Another type of device, generally known by the name of a cam cleat, comprises a mount through which the line passes, and a cam with an eccentric which can move in terms of pivoting in this mount. The cam can be moved between a locked position in which it grips the line between it and the bottom of the mount, and an unlocked position in which it is located some distance from the line and therefore does not impede the free running of this line through the device.

This type of device is stronger than the jamming cleats described hereinabove, but retains many of their drawbacks. In particular, the cam may become very difficult, if not impossible, to manipulate if high tension is exerted on the line, as this entails exerting tension on this line downstream of the device to balance the tension upstream and thus allow the line to be released. Exerting this downstream tension entails an additional manipulation, preventing quick release of this line in certain emergency situations. Furthermore, the wear generated on the line by this type of device is high and the grip produced is not very effective on certain high-strength fibers, the coefficient of friction of which is low.

A third type of existing device comprises a mount containing a series of platelets, these platelets being inclinable and pierced with holes. The line is engaged through these holes and the tension it experiences causes the platelets to incline. This inclination allows the platelets to press firmly against the line, which jams the latter.

This type of device slightly reduces the amount of line wear but does not overcome the aforementioned drawbacks.

There is also known, from documents DE 1 231 and FR 2 753 169, a line jammer device comprising a first line-gripping member and a second line-gripping member between which this line is engaged. Said first gripping member is mounted so that it can pivot with respect to the device and comprises a circular surface around which the line can be engaged, and said second gripping member is arranged with respect to said first gripping member in such a way as to allow said line to be gripped between it and said first gripping member. At least one of these members can move between a locked position in which it grips the line between it and the other member, and an unlocked position in which it does not exert said gripping effort, so as to allow the line to run through the device.

These devices retain the aforementioned drawbacks relating to the difficulty of releasing the line in the event of high tension, to the not insignificant wear generated on the line and to the lack of gripping efficiency with certain lines.

SUMMARY OF THE INVENTION

The present invention sets out specifically to overcome these fundamental drawbacks of devices of this type by providing a line jammer device which allows both easy and quick release of the line in all circumstances, without the need to exert tension on the line downstream of the device, perfect jamming of a line made of fibers with a low coefficient of friction, and low line wear.

The device to which the invention relates comprises a first line-gripping member and a second line-gripping member like those disclosed in the aforementioned documents DE 1 231 and FR 2 753 169.

According to the invention,
  the device is shaped in such a way that the line can be wound around said first gripping member over a fraction of a turn corresponding to an angle of more than 180°, or over a number of turns, and
  said second gripping member is arranged with respect to said first gripping member in such a way that the grip it exerts on the line is exerted once the line has been wrapped around said first gripping member by a fraction of a turn corresponding to an angle of at least 180°, or once the line has been wound around said first gripping member over a number of turns.

Winding the line around said first gripping member makes it possible to greatly reduce the residual tension experienced by the line at the second gripping member. The grip exerted by the latter can therefore be reduced accordingly, thus limiting the wear generated on the line and the forces experienced by said members in this gripping. What this means is that manipulating the mobile gripping member or members with a view to releasing the line is easy, thus eliminating the need to tension the line downstream of the device to facilitate or achieve this release. Furthermore, winding the line in the aforementioned way gives a broad contact area between this line and said first gripping member, thus generating significant amounts of friction which increase with the tension exerted on the line. This friction combines with the gripping of the line to allow the latter to be jammed perfectly even when it is made of fibers which have a low coefficient of friction.

According to one simple embodiment of the invention, the mobile gripping member or members may be movable only by manually operated manipulating means, for example using a lever. According to a preferred embodiment of this invention, the device at the same time comprises:
  manually operated manipulating means for bringing the mobile gripping member or members into their unlocked position, these manipulating means allowing the line to be released so that it can run; and means allowing the mobile gripping member or members to be moved automatically into said locked position when the tension upstream is greater than the tension downstream and allowing these same members to be moved automatically into said unlocked position when the downstream tension is at least equal to the upstream tension.

A device such as this prevents any risk of uncontrolled release of the line while it is being manipulated.

According to one possibility, in this case of automatic movement, the second gripping member can move and consists of a pivoting cam, it being possible for this pivoting cam to pivot in one direction to engage with the line, when the tension upstream is greater than the tension downstream, and to pivot in the opposite direction to release the line when the tension exerted downstream is at least equal to the tension exerted upstream.

According to another possibility in this same instance, said first gripping member can be moved toward the second gripping member when the tension upstream is greater than the tension downstream, and can be moved in the direction away from this second gripping member when the tension exerted downstream is at least equal to the tension exerted upstream.

The first gripping member may be a transverse cylinder or may consist of a drum mounted so that it can rotate on a spindle. In this second instance, the line is made to run more easily through the device by the rotation of the drum, this allowing a quick action for releasing the line.

As a preference, in this case, the device comprises releasable means for preventing the drum from rotating in the direction that corresponds to the exerting of a tension upstream that is greater than the tension downstream; these means may in particular consist of a ratchet system connected to the device and of corresponding teeth formed on the drum.

Advantageously, in this case, the device comprises manually operated manipulating means designed to allow the following:

when the device is in a locked position, the line to be jammed if the tension upstream is greater than the tension downstream, when the device is in an intermediate unlocked position, said second gripping member to be moved into its unlocked position while at the same time keeping said releasable means for preventing the drum from rotating in an active position, in which they prevent this rotation, and when the device is in a fully unlocked position, the second gripping member to be kept in its unlocked position and said releasable means for preventing the drum from rotating to be moved into an inactive position, in which they allow this rotation.

In said intermediate unlocked position, the line can slip around the drum without the drum rotating, and therefore with friction, this corresponding to controlled release of the line. In said fully unlocked position, the drum is free to rotate so that this drum is made to turn by the running of the line, which corresponds to quick release of this line.

According to an improved embodiment of the invention, the second gripping member comprises, some way away from its gripping zone intended to come into contact with the line, a first cylindrical part, parallel to the axis of the drum, forming said ratchet and, on the same side as this gripping zone, a second cylindrical part, also parallel to said axis; this second cylindrical part is engaged, with the possibility of pivoting and of sliding, in a slot; this slot is oriented in such a way that the movement of said second cylindrical part within it causes the second gripping member to pivot about the axis of said first cylindrical part into its locked position when this second gripping member is moved in a curve by the drum via said first cylindrical part engaging with one of the teeth of the drum following the exerting on the upstream part of the line of a tension that is greater than the tension downstream.

The ratchet is thus formed directly on the second gripping member, and said slot allows this second gripping member to move slightly in a curve when the tension upstream greater than the tension downstream causes the drum to rotate. This curved movement, because of the orientation of the slot, allows the second gripping member to be moved toward this drum, until the line is gripped.

According to a further improved implementation of this embodiment of the invention:

the device comprises a mount on which a lever is mounted so that it can pivot, this lever being able to move between a locked position, an intermediate unlocked position and a fully unlocked position corresponding to the aforementioned locked, intermediate unlocked, and fully unlocked positions of the device;

said slot is formed in this lever and allows said second gripping member to move when the lever is placed in said locked position, whereas it is distant from the drum when the lever is pivoted into said intermediate unlocked position;

the mount of the device comprises a cam surface against which said second cylindrical part bears as the lever is pivoted into the intermediate unlocked position; this cam surface has a curved shape and said second cylindrical part collaborates with it in such a way as to cause the second gripping member to pivot about the first cylindrical part while keeping this first cylindrical part in engagement with the corresponding tooth of the drum; and the lever comprises a stud which bears against the second gripping member when this lever is moved into said fully unlocked position, so as to disengage said first cylindrical part from the corresponding tooth of the drum.

When the lever is in the locked position, the slot allows the second gripping member to move automatically as indicated hereinabove. The pivoting of the lever into said intermediate unlocked position allows this same slot to be moved away from the drum and therefore allows the second gripping member to be moved into its unlocked position; however, this movement occurs without the ratchet that said first cylindrical part forms disengaging from the corresponding tooth of the drum, because of the collaboration between said second cylindrical part and said cam surface. Pivoting the lever into the fully unlocked position disengages the ratchet from the tooth of the drum.

Advantageously, the first gripping member comprises ribs which project, radially outward, from its exterior peripheral face, these ribs making it possible to increase the friction between the line and this first gripping member.

The possibilities of the line slipping with respect to this first gripping member are thus reduced, which encourages control over the release of said line.

Advantageously, the second gripping member is formed of the assembly of two parts, one of which comprises said first and second cylindrical parts, and the other of which comprises said line gripping zone, means being provided for allowing one of these parts to be placed relative to the other in a number of longitudinal positions and for keeping these parts in a predetermined position.

The movement of one of these parts with respect to the other allows the position of said gripping zone to be adjusted along this second gripping member, and therefore allows this position to be adapted to suit the diameter of the line that is to be jammed, to obtain optimum gripping of this line.

As a preference, the hub of the drum comprises an axial cavity which has a non-circular profile and opens to the outside of the device, this cavity being able to accommodate means for allowing this drum to be rotated by hand so that the line can be fully or partially tensioned. These means may, in particular, comprise a ratchet system, such as a needle ratchet system and a winding handle, particularly a capstan handle.

BRIEF DESCRIPTION OF THE DRAWINGS

For a full understanding thereof, the invention will be described once again hereinbelow with reference to the appended diagrammatic drawing which, by way of nonlimiting examples, depicts a number of embodiments of the device to which it relates.

DESCRIPTION OF THE PREFERRED EMBODIMENT(S)

Those parts or elements which are to be found in these various embodiments or which are similar from one embodiment to another are denoted by the same numerical references.

FIGS. 1 to 8 depict, from various angles, a line jammer device 1 which, in a locked state, is capable of jamming a line which is subjected to tension upstream of the device and, in an unlocked state, allows this line to be released.

Figure 1:
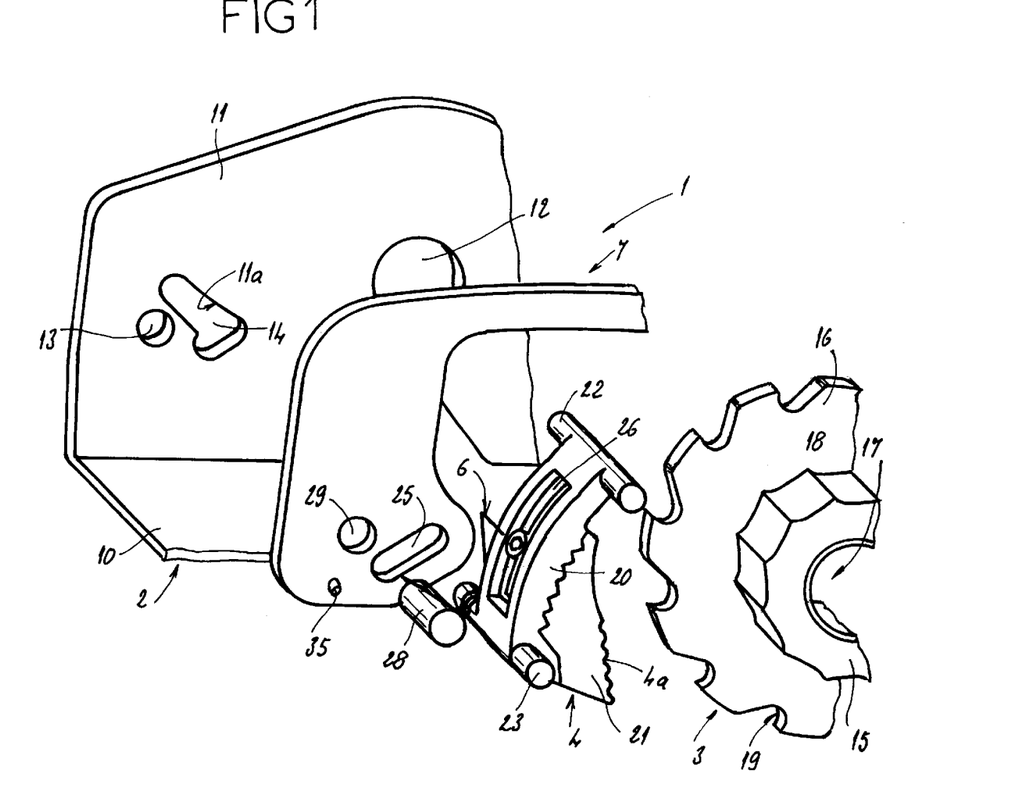
FIG. 1 is a part view in exploded perspective of the parts of which it is made according to a first embodiment, which is a preferred embodiment.
Figure 2:
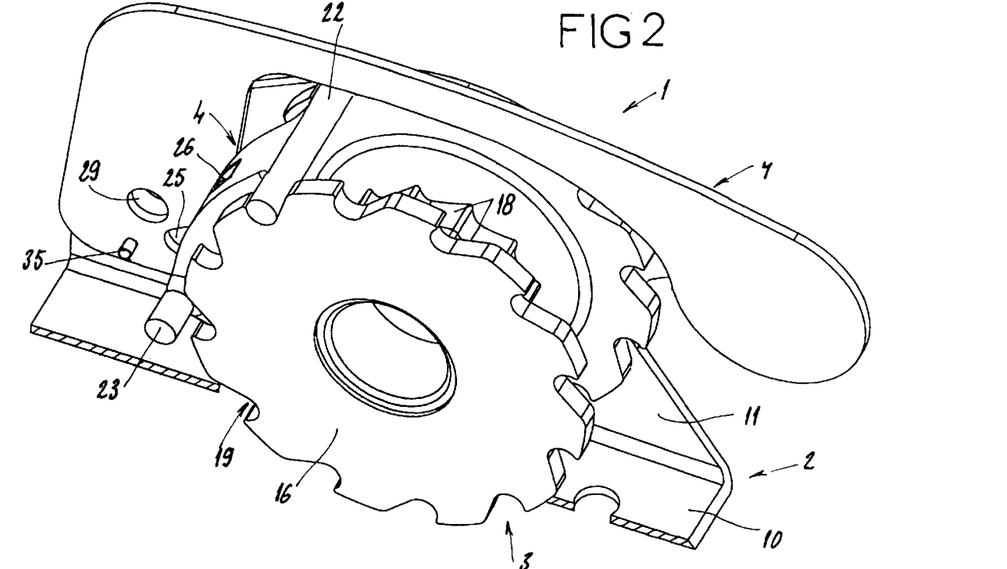
FIG. 2 is a view thereof in perspective and in longitudinal section, in the assembled state.

This device 1 comprises a mount 2, a drum 3 mounted so that it can pivot on this mount 2, a cam 4 for gripping the line 5 engaged around the drum 3, a hairpin spring 6 and a lever 7 mounted so that it can pivot on the mount 2.

This mount 2 comprises a bottom 10 intended to be bolted to a wall, particularly the deck of a sailing boat, and two lateral cheeks 11. These cheeks 11 comprise, formed facing each other, holes 12, 13 for the passage of the parts which form the pivot pins of the drum 3 and of the lever 7, and two slots 14. One of the edges 11a of the cheeks 11 which delimit these slots 14 has a curved shape, the reason for which will be explained later on.

The drum 3 comprises a hub 15 and two end plates 16. The hub 15 delimits an axial cavity 17 which accommodates the cylindrical part (not depicted) forming its pivot, and the exterior peripheral face of this hub 15 has ribs 18 projecting radially outward, shaped to create friction with the line 5. The end plates 16 for their part have teeth 19 formed in their peripheral edge and designed to collaborate with a ratchet described later on so as to prevent the drum 3 from rotating in the clockwise direction, in the example depicted, this direction of rotation corresponding to tension being exerted on the line 5 upstream of the device 1 which is greater than the tension exerted downstream of this same device.

The gripping cam 4 extends along one side of the drum 3 and comprises a zone 4a for gripping the line 5. This zone 4a is located beyond an arc over which this line 5 is wound onto this drum 3 which corresponds to an angle of more than 270°.

Figures 3, 4:
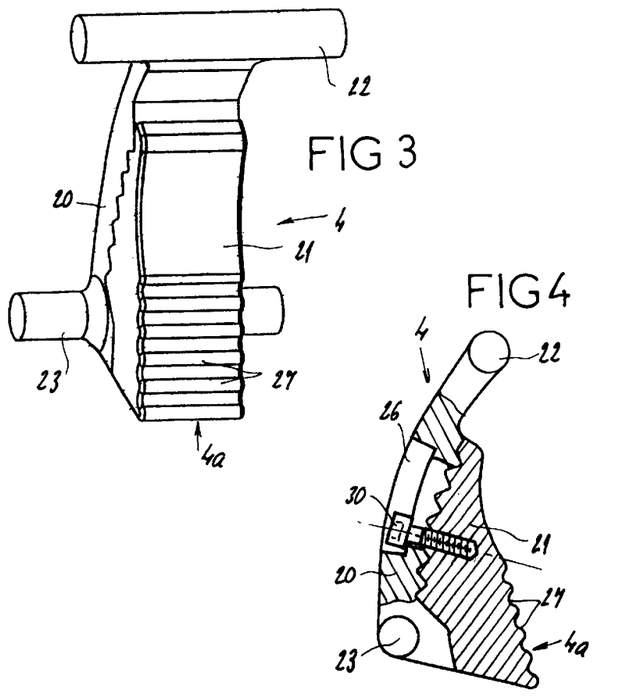
FIG. 3 is a perspective view of a gripping cam that it comprises.
FIG. 4 is a side view, in one position, of two parts which make up this cam.
Figure 5:
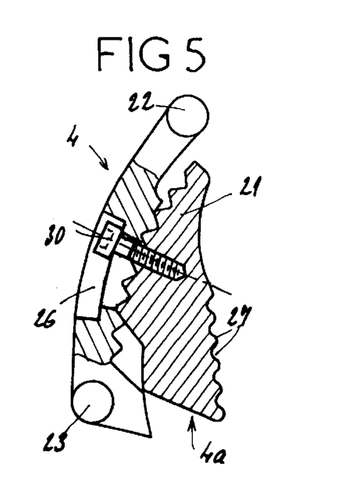
FIG. 5 is a view thereof similar to FIG. 4, with these two parts in another position.

The cam 4 consists of the assembly of two parts 20, 21 depicted more particularly in FIGS. 3 to 5. The part 20 located radially on the outside of this cam 4 with respect to the drum 3 has a curved and elongate shape. At one end it comprises a first cylindrical part 22 and at its other end it comprises a second cylindrical part 23 formed by two coaxial lateral stubs. These two cylindrical parts 22, 23 are parallel to the axis of pivoting of the drum 3.

As shown in the figures, the part 22 is intended to collaborate with the teeth 19 of the drum 3 and experiences the action of the spring 6 which urges it radially toward the inside of the drum 3. The cam 4 thus constitutes the aforementioned ratchet. The stubs of the part 23 are, for their part, engaged in the slots 14, the stub located on the same side as the lever 7 also being engaged, with the possibility of pivoting and of sliding, through a slot 25 formed in this lever 7, this slot being described later on.

The part 20 further comprises, in its central part and on its internal face, a series of transverse ribs and grooves of triangular cross section and has a slot 26 formed longitudinally through it in a direction perpendicular to the axes of the parts 22 and 23. On the outside of the part 20, this slot 26 has a width such that it can accommodate, with sliding, the head of the screw 30 described hereinafter and, on the inside of the part 20, has a width smaller than that of this head but greater than that of the body of this same screw 30, so that it can accommodate this body with sliding.

The part 21 located radially toward the inside with respect to the drum 3 has a width which increases toward one of its longitudinal ends, the widest part of this part 21 constituting said gripping zone 4a.

On its radially outer side, this part 21 comprises a series of transverse ribs and grooves of triangular cross section capable, respectively, of engaging, with the aforementioned ribs and grooves of the part 20, to define a number of possible positions that the part 21 can occupy with respect to the part 20.

The part 21 also has a tapped hole which opens into its radially outer face, it being possible for this hole to accommodate said screw 30 engaged through the slot 26. Tightening this screw 30 allows the parts 20 and 21 to be fixed together in a given relative position which is the most appropriate position for the diameter of the line 5 that is to be jammed.

Furthermore, the part 21 has teeth 27 formed in the region of the zone 4a in its edge facing toward the drum 3, to bear against this line 5.

The spring 6 is of the hairpin type. Its central winding is engaged over the base of the stub of the part 23 which passes through the slot 25; one of its lateral branches bears against the part 28 forming the pivot of the lever 7 while its other lateral branch is curved over at its free end and engaged around the cam 4.

Figure 6:
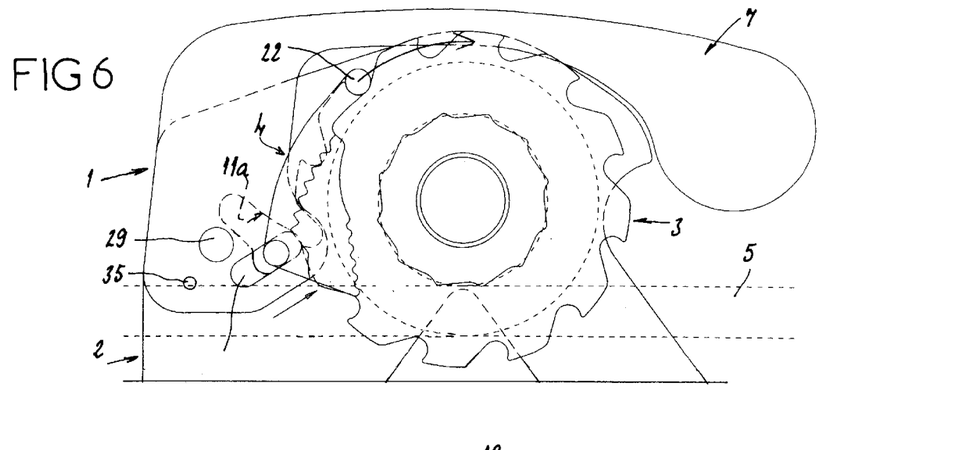
FIGS. 6 to 8 are side views of the device in locked, intermediate unlocked and fully unlocked positions thereof, respectively.
Figure 7:
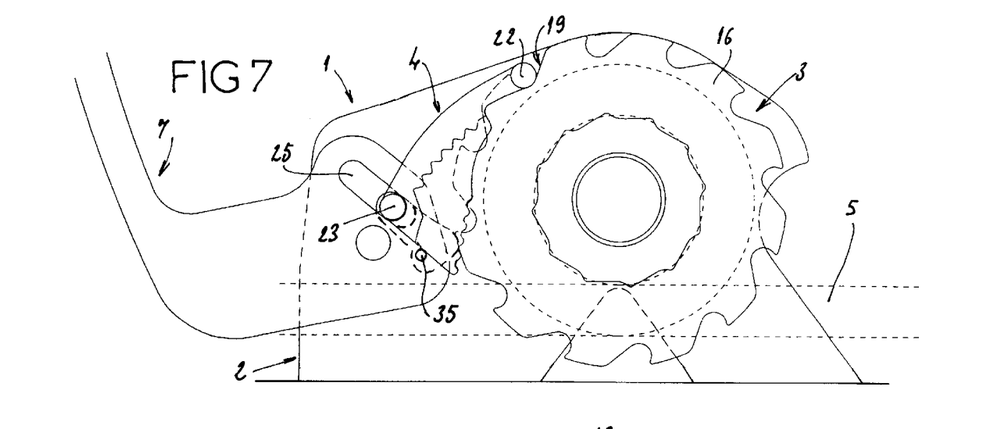
Figure 8:
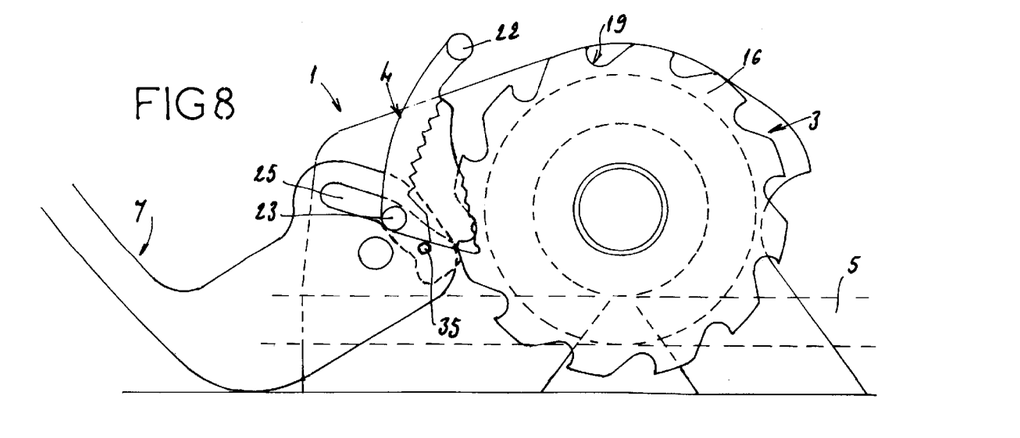

The lever 7 is mounted so that it can pivot on the mount 2 between the positions shown in FIGS. 6 to 8 which correspond respectively to the aforementioned locked, intermediate unlocked and fully unlocked positions of the device 1.

The lever 7 comprises, apart from the aforementioned slot 25, a hole 29 which accommodates the part 28 forming its pivot, and a stud 35 projecting from its face facing the cam 4. The length of this stud 35 is such that it can bear, starting from said intermediate unlocked position, and until such time as the fully unlocked position is reached, against the cam 4.

In practice, to introduce a line 5 into the device 1, the lever 7 is brought into the fully pivoted position shown in FIG. 8. In this position, the slot 25 keeps the part 23, and therefore the zone 4a, a fair distance away from the drum 3, and the stud 35 lifts the cam 4 to disengage the part 22 from the teeth 19. A broad space is thus defined between the cam 4 and the drum 3, and this drum 3 can turn so that the line 5 can easily be engaged in the device 1 from the upstream side thereof then wound around the drum 3 in a counterclockwise direction before re-emerging from the device 1 via the downstream side thereof.

The lever 7 is then placed in the intermediate position shown in FIG. 7, in which the stud 35 no longer lifts the cam 4 so that the part 22 is brought up to the teeth 19 under the action of the spring 6. The slot 25 remains distant from the drum 3 and keeps the part 23, and therefore the zone 4a, away from this drum 3.

It is then possible for the user to haul on the line 5 downstream of the device 1 by hand, and then using a capstan, so as to create tension in the line 5 upstream of the device 1.

The lever 7 is then moved into the position shown in FIG. 6. During this movement, the part 23 slips along the rounded edges 11a of the cheeks 11, which ensures that the part 22 is kept in engagement with the corresponding tooth 19, and the cam 4 is brought by the slot 25 into a position of contact with the line 5, by pivoting about the axis of the part 22.

The tension exerted downstream is released when the lever 7 is in the position shown in FIG. 6. Because of the friction of the line 5 on the ribs 18, the tension exerted upstream on the line 5 tends to cause the drum 3 to pivot in the clockwise direction. The drum 3 therefore tends, via the part 22 in engagement with one of the teeth 19, to cause the cam 4 to move in a curve in the same direction of pivoting. When the lever 7 is in this position, the slot 25 is oriented obliquely to the drum 3, the longitudinal axis of this slot 25 forming an angle of about 30° with the bottom 10 of the mount 2. The result of the aforementioned urging of the cam 4 to move in a curve and of the part 23 to slide in the slot 25 thus oriented, is that the cam 4 is pressed into a locked position in which its teeth 27 bite into the line 5 and immobilize it.

When tension is exerted again on the line 5 downstream of the device 1 so as to balance or exceed the tension upstream, said urging of the cam 4 disappears. The slots 14 and 25 then allow the cam 4 to retract into an outer radial unlocked position in which it allows the line 5 to run, with friction, between it and the drum 3.

As soon as the tension downstream ceases, the pivoting of the drum 3 returns the cam 4 to its locked position.

To release the line 5, the lever 7 is pivoted into the intermediate unlocked position shown in FIG. 7, and this moves the cam 4 away from the line 5 without disengaging the part 22 from the tooth 19. The line 5 can then slip around the drum 3 and, given the friction between this line 5 and the ribs 18, this allows controlled release of this line 5.

The pivoting of the lever 7 into the fully unlocked position shown in FIG. 8 causes the stud 35 to lift the cam 4 again until the part 22 is disengaged from the tooth 19. The drum 3 is then freed to rotate, which allows for quick release of the line 5.

Figures 9, 10:
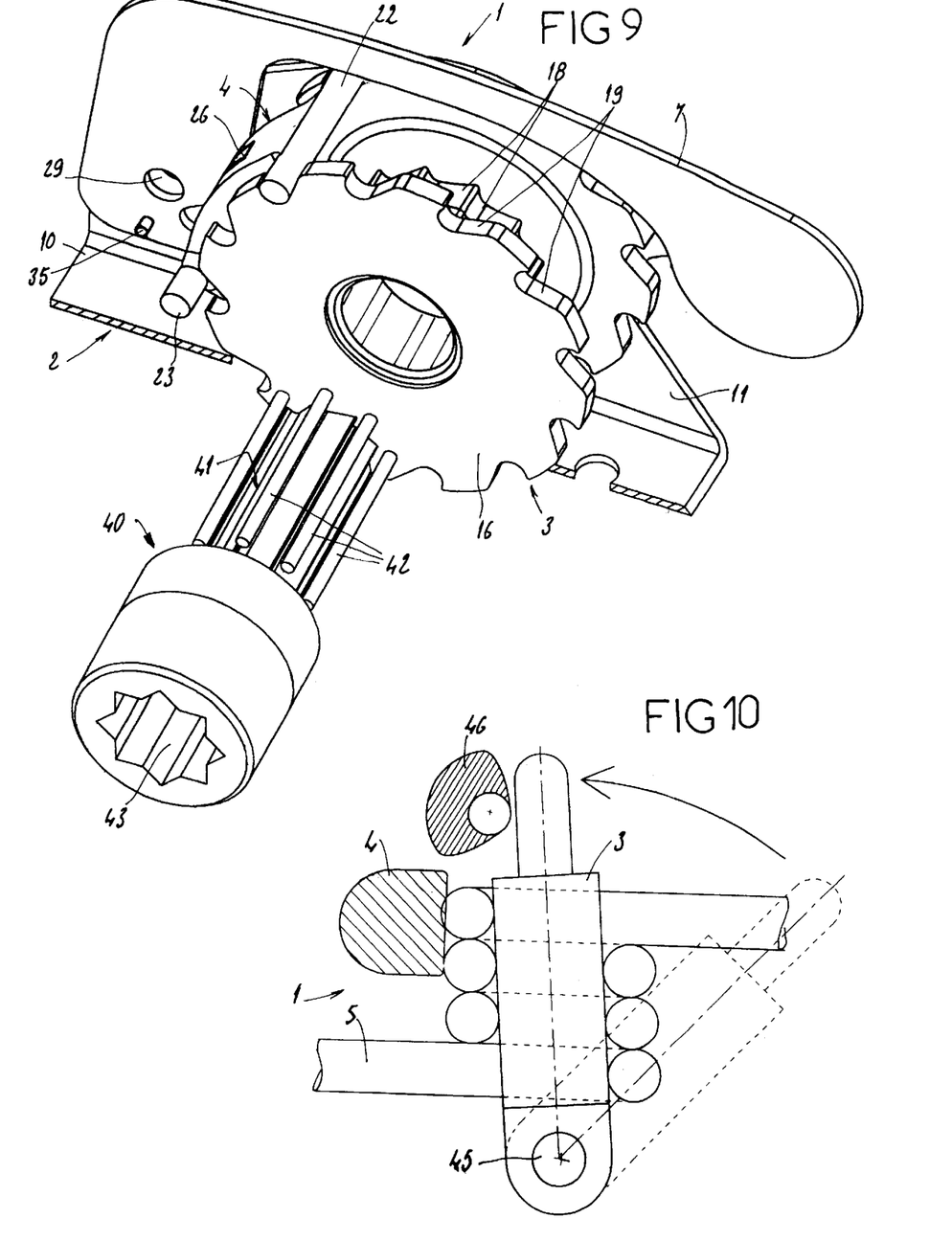
FIG. 9 is a view of the device in perspective and in longitudinal section, according to an alternative form.
FIG. 10 is a simplified view, from above, of the device according to a second embodiment.

FIG. 9 shows that as an alternative, the cavity 17 and the part 41 of the part 40 forming the pivot of the drum 3, which is intended to be engaged in this cavity 17, can be formed in such a way as to form a needle ratchet system 42 known per se. The part 40 also has a cavity 43 opening to the outside of the mount 2, capable of accommodating a capstan handle.

The line 5 may thus be tensioned by driving the drum 3 directly using this handle.

FIG. 10 shows a very diagrammatic and simplified embodiment of the device 1.

In this case, the device 1 comprises a cylindrical part 3 around which the line 5 is wound over a number of turns, this part 3 being mounted so that it can pivot by one end about a pivot 45 the axis of which is perpendicular to that of this part 3 and of the line 5. Tension upstream greater than tension downstream causes the part 3 to pivot about this pivot 45 and presses the turns of the line 5 against a nearby part 4, thus gripping said turns. A pivoting cam 46 allows the part 3 to be moved away from the part 4 to free the line 5 to run.

Figure 11:
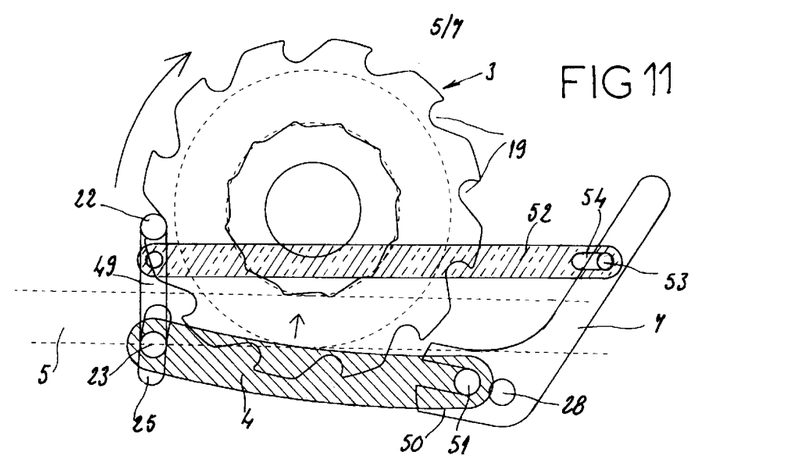
FIGS. 11 to 13 are simplified side views of the device according to a third embodiment, in locked, intermediate unlocked and fully unlocked positions thereof, respectively.
Figure 12:
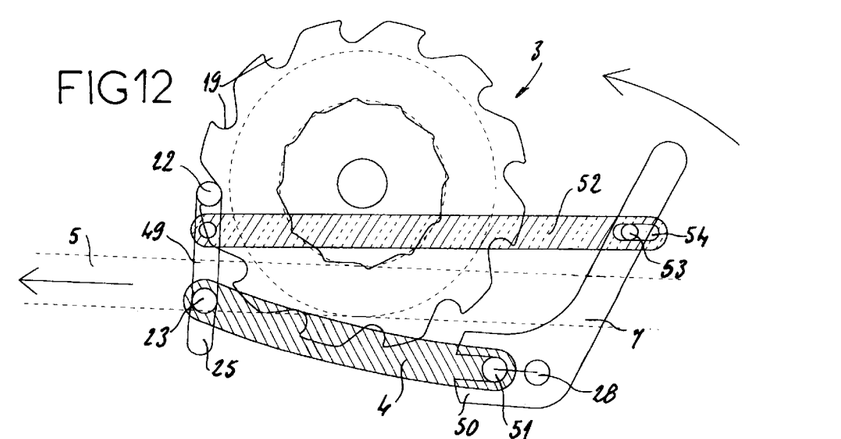
Figure 13:
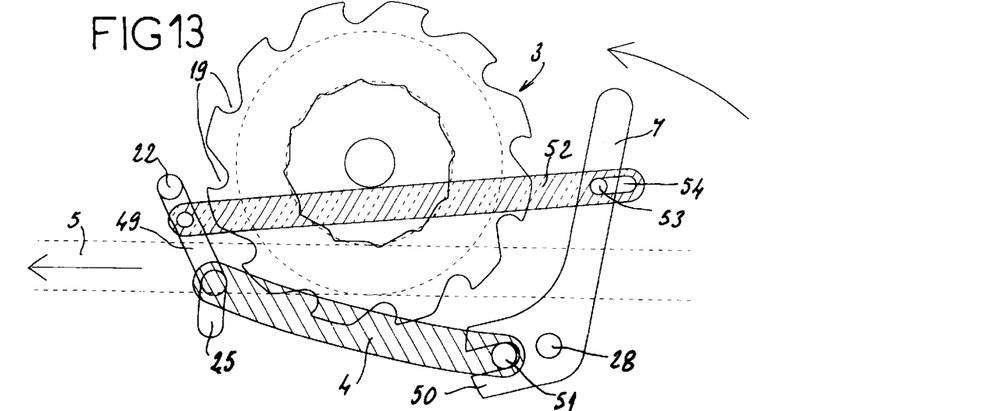
Figure 14:
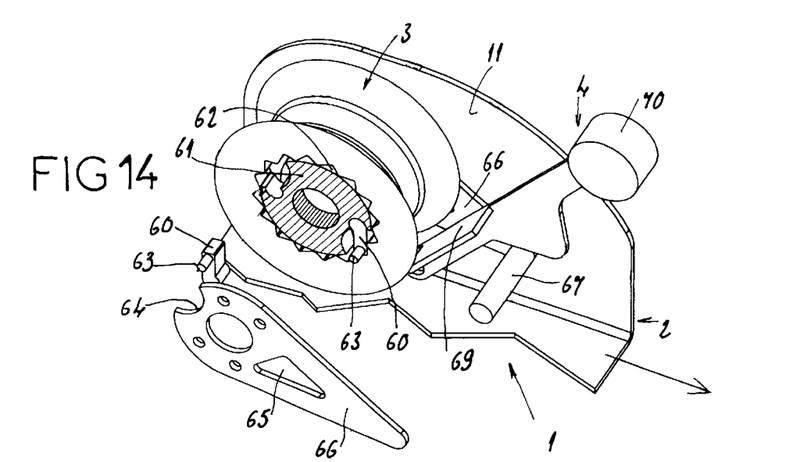
FIG. 14 is a view in exploded perspective, with cutaway, of the device according to a fourth embodiment.
Figure 15:
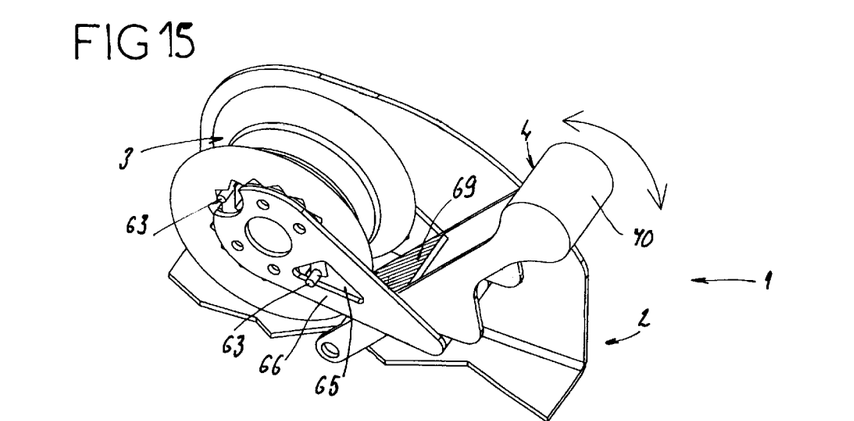
FIG. 15 is a view thereof similar to FIG. 14, in the assembled state.
Figure 16:
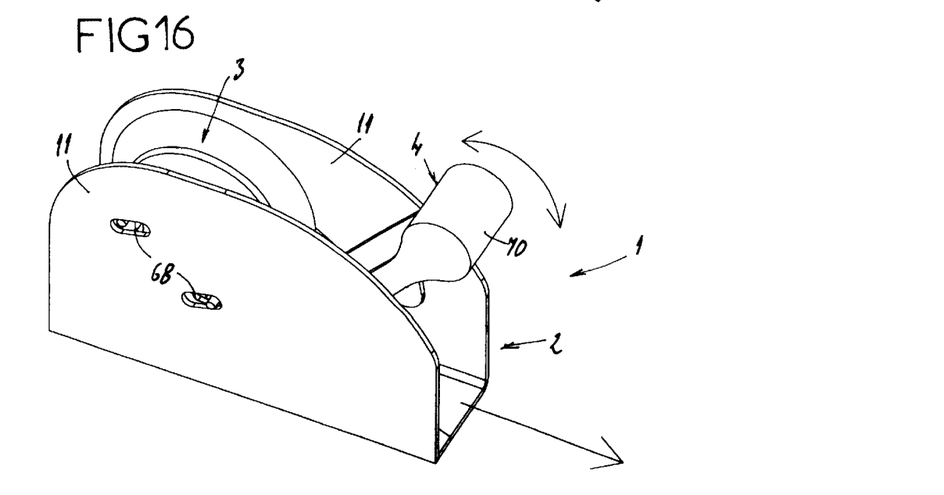
FIG. 16 is a perspective view thereof.
Figure 17:
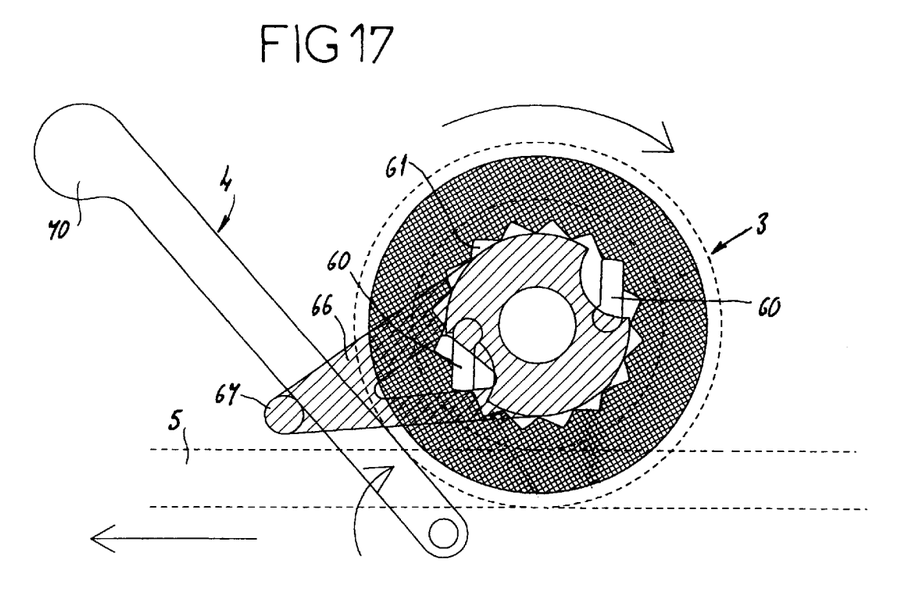
FIG. 17 is a simplified side view thereof.

In the embodiment shown in FIGS. 11 to 13, the device 1 comprises:
 a bar 4 for gripping the line 5,
 a ratchet 49 comprising a part 22 which engages with the teeth 19 of the drum 3 and a part 23 which is engaged in a slot 25 and which allows the ratchet 49 to be connected in a pivoting way to one end of the bar 4,
 a pivoting lever 7, a fork shaped part 50 of which is engaged with pivoting around a stub 51 formed in the other end of the bar 4, and
 a linkage 52 which connects the lever 7 and the ratchet 49, this lever 7 comprising a stub 53 engaged in a slot 54 in the linkage 52.

In the locked position shown in FIG. 11, the pivoting of the drum 3 in the clockwise direction under the effect of tension upstream causes the ratchet 49 to move in a curve and press the bar 4 into the locked position; the slot 25 allows this bar 4 to move into its unlocked position if the tension downstream is at least equal to the tension upstream.

In the intermediate unlocked position of the device 1 shown in FIG. 12, the lever 7 moves the downstream end of the bar 4 away from the line 5, which allows controlled release of this line. The ratchet 49 remains in engagement with the tooth 19 because of the sliding of the stub 53 in the slot 54.

When the device 1 is in the fully unlocked position shown in FIG. 13, the stub 53 is in abutment against the lever 7, which moves the linkage 52 to release the part 22 of the ratchet 49.

The device 1 shown in FIGS. 14 to 17 comprises a system made up of two pivoting ratchets 60, a hub 61, and an internal set of teeth forming teeth 62 which is formed in the drum 3.

The ratchets 60 have rounded parts which are engaged and can pivot in corresponding notches formed in the hub 61, and straight lateral parts which can collaborate with the teeth 62. These ratchets 60 comprise axial stubs 63 engaged through a notch 64 and a slot 65 which are formed in a radial arm 66, this arm 66 being mounted on the hub 61 coaxially therewith. The arm 66 is connected via a transverse pin 67 to a similar arm 66 located on the other side of the drum 3. The stubs 63 are also engaged through slots 68 formed in one of the cheeks 11. A gripping cam 4 is mounted so that it can pivot on the mount 2 under the drum 3, this cam 4 resting against the pin 67 and having a surface 69 for gripping the line 5 between it and this drum 3.

The tension upstream tends to cause the hub 61, and therefore the arms 66 and pin 67, to pivot until this presses the cam 4 into a radially inward position in which the surface 69 grips the line between it and the drum 3. Release is achieved by acting on the end 70 of this cam 4 to manually incline this cam 4 downward, so as to allow the line to run; the notch 64 and the slot 65 are such that the arm 66 does not act on the stubs 63 during this movement, which means that the ratchets 60 remain in engagement with the teeth 62. Continuation of said inclination makes it possible, as the end of travel of this inclination is reached, and through collaboration between the stubs 63 and the edges of the cheeks 11 delimiting the slots 68, to cause the ratchets 60 to pivot toward the inside of the drum 3 so as to free the latter to rotate.

The invention thus provides a device 1 for jamming a line 5 which overcomes the drawbacks of similar devices of the prior art because this device allows both quick and easy release of the line 5 under all circumstances without entailing the exertion of tension on the line 5 downstream of the device, perfect jamming of a line 5 made of fibers with a low coefficient of friction, and reduced wear on the line 5.

It goes without saying that the invention is not restricted to the embodiment described hereinabove by way of example but that on the contrary it encompasses all alternative forms. Thus, the line 5 may be wound over just a fraction of a turn, this fraction however corresponding to an angle of more than 180° at minimum, in which case the drum may be replaced by a simple pulley wheel; the device may be fixed to a wall by the aforementioned bottom 10 or may have holes in one or other of the cheeks 11 for attachment by this cheek; the slots 14 may be replaced by a wall projecting from the interior face of the cheek 11, which is shaped to delimit said cam surface 11a; the lever 7 may consist of a single end plate, as shown in the drawing, or two end plates, each of which is located along one of said cheeks 11, each of these end plates then having a slot 25 and a cam surface 11a, each stub 23 being engaged in this slot 25 and collaborating with this surface 11a; the spring 6 could be of any other type, particularly a coil spring.

What is claimed is:

1. A line jammer device for, in a locked state, jamming a line which is under tension upstream of the device and, in an unlocked state, releasing the line; the device comprises first and second members for gripping the line, between which members the line is engaged, said first gripping member being mounted so that it can pivot with respect to the device and comprising a circular surface around which the line can be engaged, and said second gripping member being arranged with respect to said first gripping member in such a way as to allow said line to be gripped between it and said first gripping member, at least one of the members being able to move between a locked position in which it grips the line which it grips the line between it and the other member and an unlocked position in which it does not exert said gripping effort, so as to allow the line to run through the device;

this being a device:
which is shaped in such a way that the line can be wound around said first gripping member between a fraction of a turn corresponding to an angle of more than 180° and at least one turn and wherein said second gripping member is arranged with respect to said first gripping member in such a way that the grip it exerts on the line is exerted once the line has been wrapped around said first gripping member by between a fraction of a turn corresponding to an angle of at least 180° and at least one turn.

2. The device as claimed in claim 1, and which, at the same time, comprises:

manually operated manipulating means for bringing at least one gripping member into the unlocked position, these manipulating means allowing the line to be released so that it can run; and means for allowing the at least one gripping member to be moved automatically into the locked position when the tension upstream is greater than the tension downstream and allowing the at least one gripping member to be moved automatically into the unlocked position when the downstream tension is at least equal to the upstream tension.

3. The device as claimed in claim 2, wherein the second gripping member can move and consists of a pivoting cam, it being possible for this pivoting cam to pivot in one direction to engage with the line, when the tension upstream is greater than the tension downstream, and to pivot in the opposite direction to release the line when the tension exerted downstream is at least equal to the tension exerted upstream.

4. The device as claimed in claim 2, wherein said first gripping member can be moved toward the second gripping member when the tension upstream is greater than the tension downstream, and can be moved in the direction away from this second gripping member when the tension exerted downstream is at least equal to the tension exerted upstream.

5. The device as claimed in claim 1, wherein the first gripping member is a transverse cylinder.

6. The device as claimed in claim 1, wherein the first gripping member consists of a drum mounted so that it can pivot on a spindle.

7. The device as claimed in claim 6, and which comprises releasable means for preventing the drum from rotating in the direction of rotation of this drum that corresponds to the exerting of a tension on the line upstream of the device that is greater than the tension exerted downstream.

8. The device as claimed in claim 7, wherein said releasable means consist of a ratchet system connected to the device and of corresponding teeth formed on the drum.

9. The device as claimed in claim 8, and which comprises manually operated manipulating means designed to allow the following:

when the device is in a locked position, the line to be jammed if the tension upstream is greater than the tension downstream, when the device is in an intermediate unlocked position, said second gripping member to be moved into its unlocked position while at the same time keeping said releasable means for preventing the drum from rotating in an active position, in which they prevent this rotation, and when the device is in a fully unlocked position, the second gripping member to be kept in its unlocked position and said releasable means for preventing the drum from rotating to be moved into an inactive position, in which they allow this rotation.

10. The device as claimed in claim 8, wherein the second gripping member comprises, apart from its gripping zone intended to come into contact with the line, a first cylindrical part, parallel to the axis of the drum, forming said ratchet system and, on the same side as the gripping zone, a second cylindrical part, also parallel to said axis; the second cylindrical part is engaged, with the possibility of pivoting and of sliding, in a slot; the slot is oriented in such a way that the movement of said second cylindrical part within it causes the second gripping member to pivot about the axis of said first cylindrical part to cause said gripping zone to grip the line when the second gripping member is moved in a curve by the drum via said first cylindrical part engaging with one of the teeth of the drum following the exerting on the upstream part of the line of a tension that is greater than the tension downstream.

11. The device as claimed in claim 10, with the following characterizing features:

it comprises a mount on which a lever is mounted so that it can pivot, this lever being able to move between a locked position, an intermediate unlocked position and a fully unlocked position corresponding to the aforementioned locked, intermediate unlocked, and fully unlocked positions of the device;

said slot is formed in this lever and allows said second gripping member to move when the lever is placed in said locked position, whereas it is distant from the drum when the lever is pivoted into said intermediate unlocked position;

the mount comprises a cam surface against which said second cylindrical part bears as the lever is pivoted into the intermediate unlocked position; this cam surface has a curved shape and said second cylindrical part collaborates with it in such a way as to cause the second gripping member to pivot about said first cylindrical part while keeping this first cylindrical part in engagement with the corresponding tooth of the drum; and the lever comprises a stub which bears against the second gripping member when this lever is moved into said fully unlocked position, so as to disengage said first cylindrical part from the corresponding tooth of the drum.

12. The device as claimed in claim 10, wherein the second gripping member is formed of the assembly of two parts, one of which comprises said first and second cylindrical parts, and the other of which comprises said line gripping zone, means being provided for allowing one of these parts to be placed relative to the other in a number of longitudinal positions and for keeping these parts in a predetermined position.

13. The device as claimed in claim 6, wherein the hub of the drum comprises an axial cavity which has a non circular profile and opens to the outside of the device, this cavity being able to accommodate means for allowing this drum to be rotated by hand so that the line can be fully or partially tensioned.

14. The device as claimed in claim 13, wherein said means for manually rotating the drum comprises a ratchet system and a winding handle.

15. The device as claimed in claim 13, wherein said means for manually rotating the drum comprises a needle ratchet system and a capstan handle.

16. The device as claimed in one of claims 1, wherein the first gripping member comprises ribs which project, radially outward, from its exterior peripheral face, these ribs making it possible to increase the friction between the line and this first gripping member.

* * * * *